United States Patent [19]

Park

[11] Patent Number: 5,521,642
[45] Date of Patent: May 28, 1996

[54] DECODING SYSTEM FOR COMPACT HIGH DEFINITION TELEVISION RECEIVERS

[75] Inventor: Hak-Jae Park, Incheon, Rep. of Korea

[73] Assignee: Daewoo Electronics Co., Ltd., Seoul, Rep. of Korea

[21] Appl. No.: 133,663

[22] Filed: Oct. 7, 1993

[30] Foreign Application Priority Data

Oct. 7, 1992 [KR] Rep. of Korea ................ 92-18394

[51] Int. Cl.$^6$ .......................... H04N 7/12; H04N 7/30
[52] U.S. Cl. .................. 348/409; 348/402; 348/416
[58] Field of Search ............................. 348/395, 403, 348/404, 405, 407, 409, 412, 415, 416, 699, 564, 565, 402, 384, 390, 397, 384, 400, 408, 394; 358/456, 426, 428, 430; H04N 7/12, 7/30

[56] References Cited

U.S. PATENT DOCUMENTS

| | | | |
|---|---|---|---|
| 5,001,559 | 3/1991 | Gonzales et al. | 348/384 |
| 5,046,071 | 9/1991 | Tanoi | 348/415 |
| 5,113,255 | 5/1992 | Nagata et al. | 348/416 |
| 5,189,526 | 2/1993 | Sasson | 348/397 |
| 5,243,420 | 9/1993 | Hibi | 348/409 |
| 5,262,854 | 11/1993 | Ng | 348/699 |
| 5,278,646 | 1/1994 | Civanlar et al. | 348/384 |
| 5,363,139 | 11/1994 | Keith | 348/409 |

Primary Examiner—Tommy P. Chin
Assistant Examiner—Vu Le
Attorney, Agent, or Firm—William F. Pinsak

[57] ABSTRACT

A simplified decoding system for providing a reduced image frame to a high definition television receiver with a small size screen through the use of d.c. transform coefficients. The decoding system selectively decodes and inverse quantizes d.c. transform coefficients to produce a set of difference data, each of which represents an average of pixel differences between a block of two-dimensional pixels of a current frame and a corresponding block of its preceding frame. Each of two-dimensional motion vectors is also decoded and modified to derive a pixel data from the previous reduced image frame. The derived pixel data and the average pixel difference value are successively combined so as to generate the reduced frame.

2 Claims, 3 Drawing Sheets

DECODING SYSTEM FOR COMPACT HIGH DEFINITION TELEVISION RECEIVERS

FIELD OF THE INVENTION

The present invention relates to a digital image decoder for use in a high definition television receiver; and, more particularly, to a digital image decoder for a compact-sized high difinition television receiver having a small-sized screen through the use of d.c. transform coefficients.

DESCRIPTION OF THE PRIOR ART

Transmission of digitized television signals makes it possible to deliver video images of a much higher quality than that of analog signals. When an image signal comprising a sequence of image "frames" is expressed in a digital form, a substantial amount of data need be transmitted, especially in the case of high defition television (HDTV) system. Since, however, the available frequency bandwidth of a conventional transmission channel is limited, in order to transmit substantial amounts of digital data, e.g., about 900 Mbits per second, through the limited channel bandwidth, e.g., of 6 MHz, it is inevitable to compress the image signal.

Among various video compression techniques, the so-called hybrid coding technique, which combines spatial and temporal compression techniques, is known in the art to be most effective.

Most hybrid coding techniques employ a motion-compensated DPCM (Differential Pulse Code Modulation), two-dimensional DCT (Discrete Cosine Transform), quantization of DCT coefficients, RLC (Run-Length Coding) and VLC (Variable Length Coding). The motion-compensated DPCM, wherein an image frame is divided into a plurality of subimages (or blocks), is a process of determining the movement of an object between a block of a current frame and a corresponding block of its previous frame, and predicting the current frame according to the motion flow to produce a predictive error signal representing the difference between the current frame and its prediction. This method is described, for example, in Staffan Ericsson, "Fixed and Adaptive Predictors for Hybrid Predictive/Transform Coding", *IEEE Transactions on Communication, COM*-33, No. 12 (December 1985); and in Ninomiya and Ohtsuba, "A Motion-Compensated Interframe Coding Scheme for Television Pictures", *IEEE Transactions on Communications, COM*-30, No. 1(January 1982).

The two-dimensional DCT converts a block of digital image signal, for example, a block of 8×8 pixels, into a set of transform coefficients. This technique is described in Chen and Pratt, "Scene Adaptive Coder", *IEEE Transactions on Communications, COM*-32, No. 3(March 1984). Among the transform coefficients, the one which represents the average value of the pixels in a block is called a d.c. coefficient. This coefficient carries the greatest share of the energy in the transform domain; and the remaining transform coefficients, which all represent zero mean, are called a.c. coefficients. By processing the transform coefficients with a quantizer, zigzag scanning, RLC and VLC, the amount of data to be transmitted can be effectively compressed. The motion vectors obtained by the motion-compensated DPCM are also coded by VLC.

Referring to FIG. 1, there is disclosed a conventional decoding system incorporated in a HDTV receiver employing a hybrid coding technique, which includes: a variable length decoder 12, a run-length decoder 14, an inverse zigzag scanner 16, an inverse quantizer 18, an inverse DCT means 20, a frame memory 22 for storing previous frame data, a motion compensator 24 and an adder 28 for generating current block data from the previous frame data, and motion vector and prediction error data. Since most HDTV receivers incorporating the decoding system require a large-screen display with a wider aspect ratio of about 16:9 than conventional television systems which have an aspect ratio of 4:3, the above described components of the decoding system should perform a substantial amount of complicated tasks; and, thus, the decoding system tends to be of a complicated structure, entailing a high manufacturing cost.

Sometimes, however, consumers may demand compact-sized HDTV receivers which are handy to carry. In order to satisfy such demand, it becomes necessary to construct its decoding system such that it can provide a reduced size picture for a HDTV receiver having a small size screen.

An article entitled "Image display techniques using the cosine transform" by King N. Negan, *IEEE Transactions on Acoustics and Signal Processing*, ASSP-32, No. 1 (February 1984) discloses that a low resolution preview image can be developed from the first few transform coefficients of an image by transmitting the transform coefficients in an order that represents increasing spatial frequencies, and performing an inverse transformation on the first few coefficients that are received. However, the Negan paper does not suggest a decoding system suitable for compact-sized HDTV receivers.

SUMMARY OF THE INVENTION

It is, therefore, an object of the present invention to provide a simplified decoding system adapted for use in a compact-sized HDTV receiver.

Another object of the present invention is to provide a simplified decoding system capable of providing a small size picture suitable for a compact HDTV receiver.

In accordance with the invention, there is provided a simplified decoding system which is capable of providing a reduced image frame to a compact-sized HDTV receiver with a small size screen through the use of d.c. transform coefficients. The decoding system selectively decodes and inversely quantizes d.c. transform coefficients only so as to produce a set of difference data, each of which represents an average of pixel difference values between a block of two-dimensional pixels of a current frame and a corresponding block of its preceding frame. Each of the two-dimensional motion vectors is also decoded and modified to compensate the reduced image frame and to derive a pixel data from the previous reduced frame based on the modified motion vector. The derived pixel data and the average pixel difference data are combined so as to generate the reduced frame.

BRIEF DESCRIPTION OF THE DRAWINGS

The above and other objects and features of the present invention will become apparent from the following description of the preferred embodiments given in conjunction with the accompying drawings, in which.

DETAILED DESCRIPTION OF THE PREFERRED EMBODIMENTS

Figure 1:
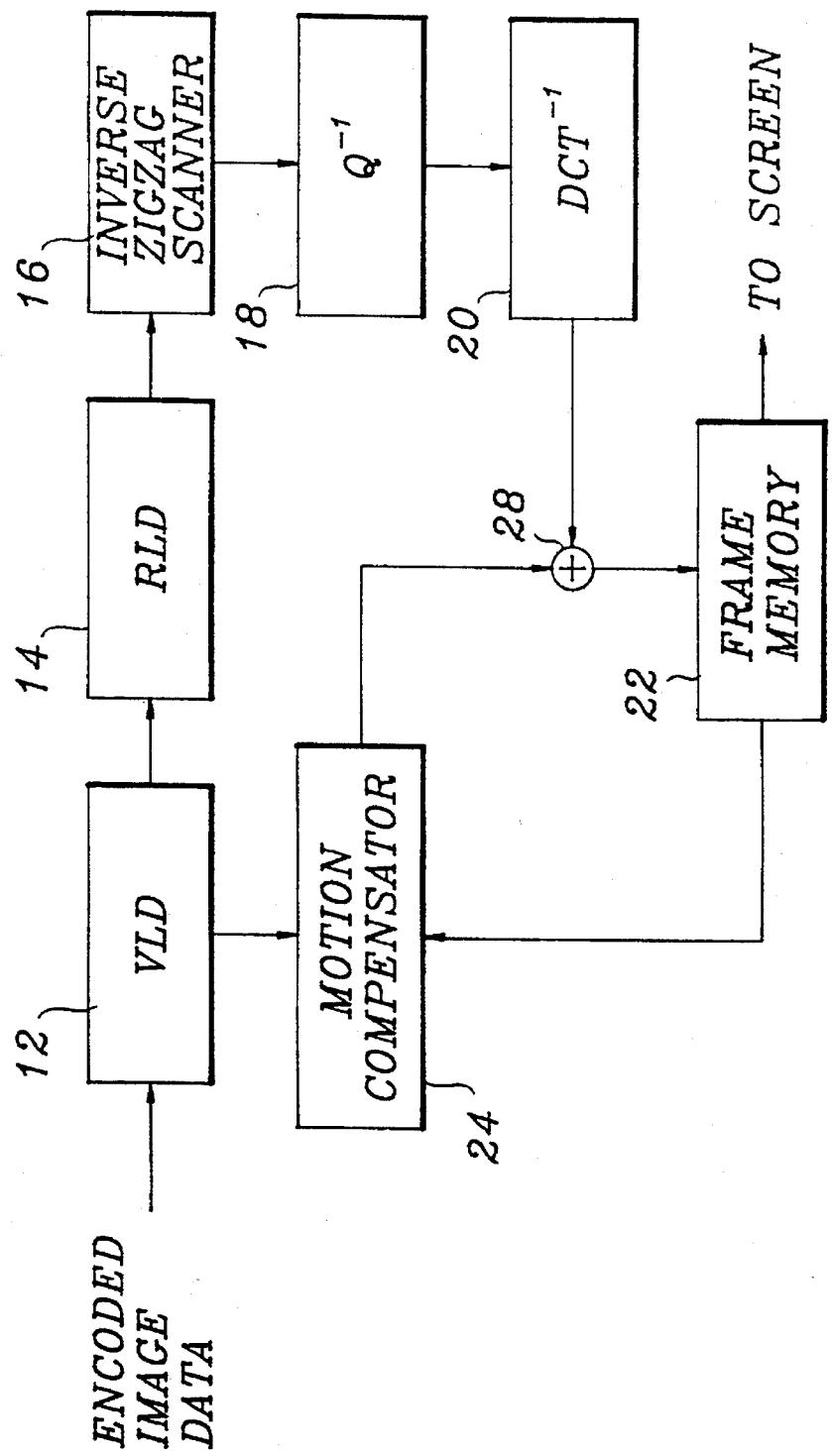
FIG. 1 shows a block diagram of a conventional decoding system utilized in a HDTV receiver.
Figure 2:
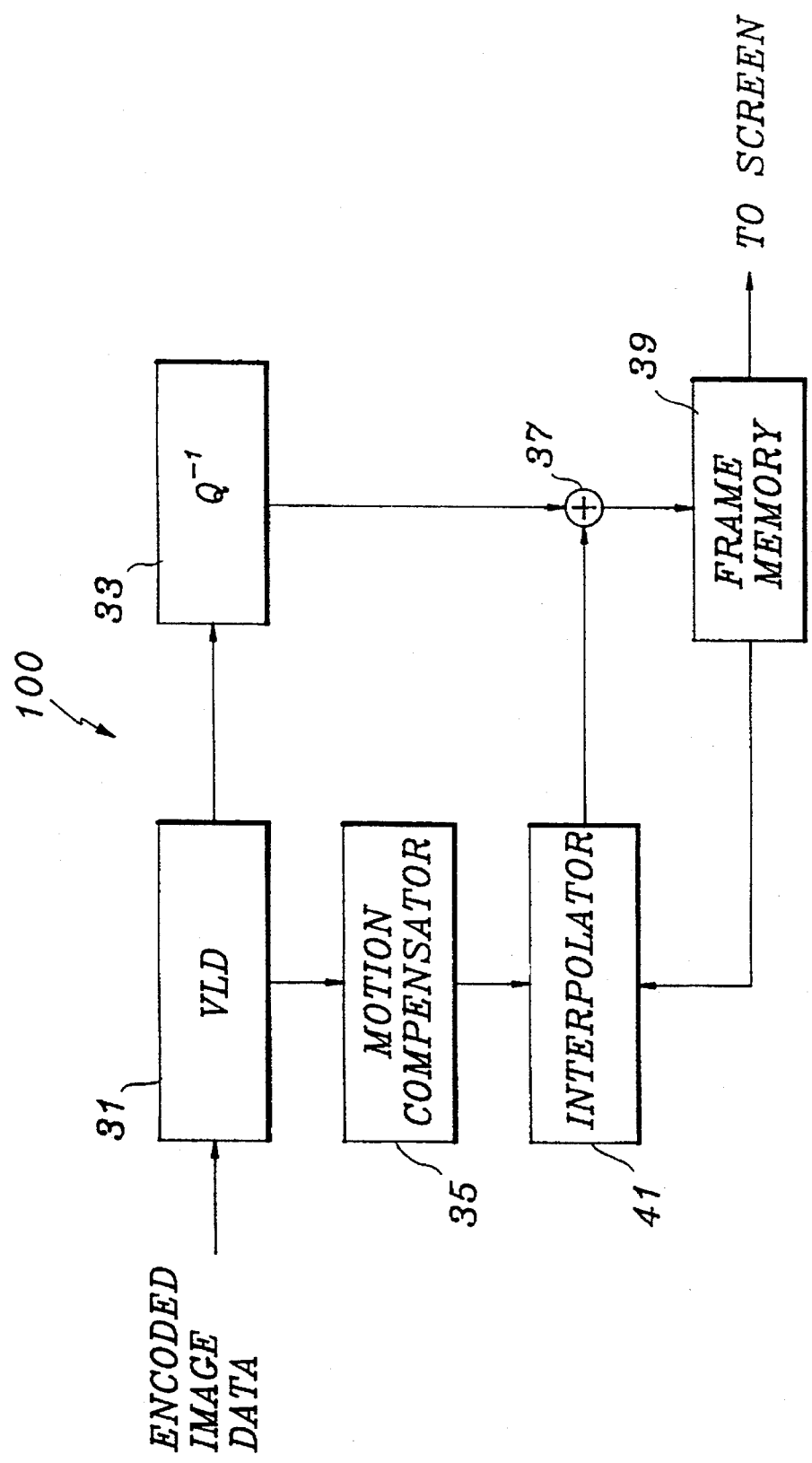
FIG. 2 is a block diagram of a simplified decoding system adapted for use in a compact-sized HDTV receiver in accordance with the present invention.

Referring now to FIG. 2, there is shown a block diagram schematically illustrating a decoding system 100 for providing reduced size pictures to a compact-sized HDTV receiver.

A sequence of encoded digital signals is inputted to the decoding system 100. Each of the input signals includes a set of variable length coded transform coefficients which have been encoded from the difference values between a block of two-dimensional pixels of a current frame and a corresponding block of its preceding frame after motion compensation and a variable length coded two-dimensional motion vector data which represents a motion displacement between the two blocks. A variable length decoder (VLD) 31 decodes the set of variable length coded transform coefficients and the motion vectors to send the transform coefficient data to an inverse quantizer $Q^{-1}$ 33 and the motion vector data to a motion compensator 35. The VLD 31 is basically a look-up table: that is, in the VLD 31, a plurality of code sets is provided to define respective relationships between variable length codes and their run-length codes or motion vectors.

In accordance with the present invention, in the VLD 31, not all of the variable length coded transform coefficients in a set are decoded, but a first one of them is selectively decoded to generate a quantized DCT coefficient. The quantized DCT coefficient corresponds to a d.c. coefficient among a set of DCT coefficients which would have been generated through their conversion by using such means as a run-length decoder and a zigzag scanner.

The inverse quantizer $Q^{-1}$ 33 converts the d.c. coefficient into a difference data which represents an average of pixel difference values between a given block of two-dimensional pixels of the current frame and its corresponding block of the previous frame. And then, the average pixel difference data is supplied to an adder 37 to form an image frame.

As well known in the art, the DCT transform coefficients have a ststistic distribution in the frequency region between a d.c. component zone to a high frequency zone with non-zero or significant transform coefficients mainly appearing in the low frequency zone and the zero or insignificant transform coefficients appearing mainly in the high frequency zone. These high frequency components may be truncated or do not have to be utilized in generating images of a reduced size. Accordigly, it may be possible to utilize the lower frequency zone only to reproduce a reduced size picture. In accordance with a preferred embodiment of the invention, a d.c. coefficient is utilized in producing a reduced size picture.

Supposing now that a block of a current frame is of 8×8 pixels, each of the pixels is converted into a set of DCT coefficients before being transmitted to the receiver. As previously discussed, the d.c. coefficient in the set of the DCT coefficients is the one having the average value of the 64 pixels in the block. Therefore, it will be appreciated that each of the d.c. coefficients having the average values can be used to produce a representative signal of the blocks constituting the current frame, capable of producing a reduced size picture. When the d.c. coefficients are utilized to produce the reduced size picture, such processes as run-length decoding, inverse zigzag scanning and inverse discrete cosine transform are not required and thus a desired simplified decoding system is achieved.

In the meanwhile, the variable length decoded motion vector from the VLD 31 is fed to the motion compensator 35. As described above, since an image frame is formed on the basis of the average pixel difference data, the number of pixels for a block is reduced to 1/64: in other words, both the horizontal and the vertical direction pixels in the block are reduced by a predetermined factor N, e.g., 8, respectively. Therefore, the motion vector, specifically, the horizontal vector component MVH and the vertical vector component MVV from the VLD 31, are also reduced in their horizontal and vertical lengths to compensate the reduced size picture. Accordingly, the motion compensator 35 performs to divide or reduce the horizontal vector component and the vertical vector component by a predetermined factor N, e.g., 8, respectively, which are then fed to an interpolator 41.

The interpolator 41 extracts a corresponding pixel data from the previous frame stored in a frame memory 39 based on the motion vector reduced by the factor of, e.g., 8 in the motion compensater 35 and applies the corresponding pixel data to the adder 37. The corresponding pixel data derived from the interpolator 41 and the average pixel difference data from the inverse quantizer $Q^{-1}$ 33 are summed up at the adder 37 to constitute a representative image data of a given block of the current frame and written onto the frame memory 39. However, the reduced motion vector from the motion compensater 35 does not always coincide with the pixel position of the previous frame stored in the frame memory 39; and, therefore, a pixel data of the previous frame is interpolated, in accordance with the invention, by using the interpolator 41 and then applied to the adder 37. Details of the interpolation process will be described hereinafter with reference to FIG. 3. The average pixel difference data from the inverse quantizer $Q^{-1}$ 33 and the interpolated pixel data from the interpolator 41 are added up to provide a representative image data for a block of 8×8 pixels in the current frame. The representative image data is successively stored in the frame memory 39 so as to generate the reduced image frame for display.

Figure 3:
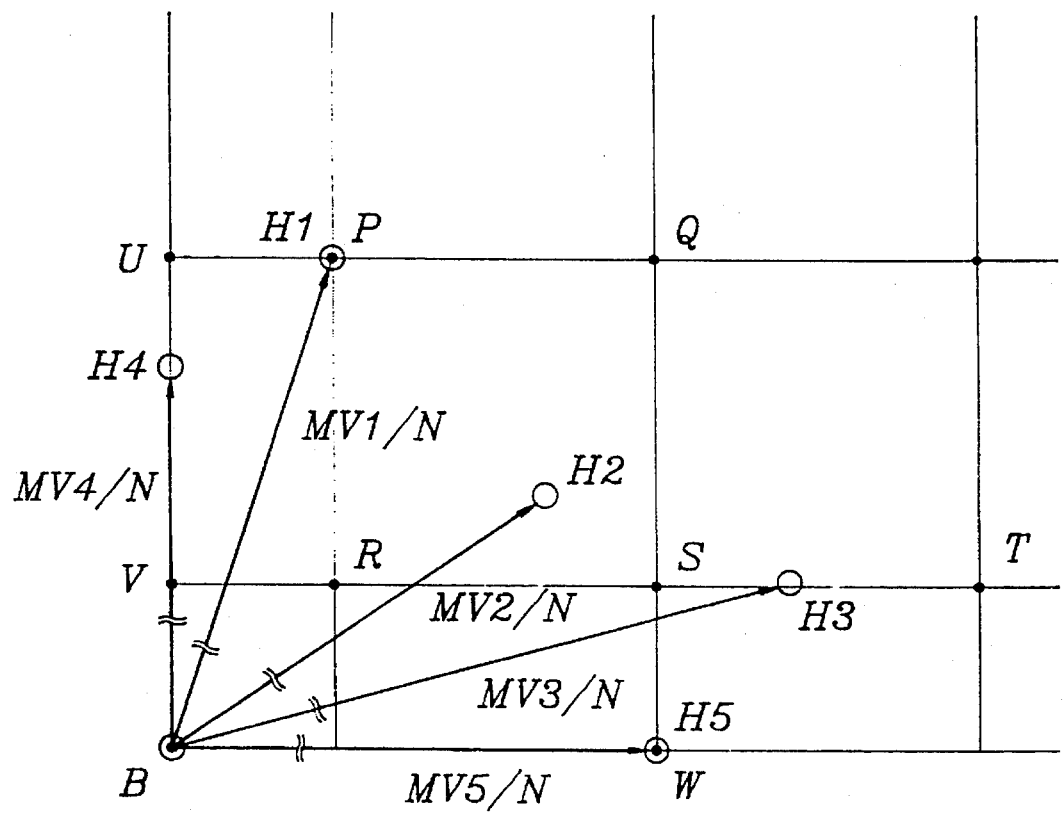
FIG. 3 explains the motion prediction and interpolation performed in the decoding system as shown in FIG. 2 for generating a reduced size picture in accordance with the invention.

In FIG. 3, there is illustrated a spatial relationship between a pixel of a reduced current frame and pixels on its preceding frame operated by a reduced motion vector MV/N. By definition, as well known in the art, a motion vector operates from a base, which is a current pixel projected on its preceding frame, to a head which is a pixel in the preceding frame. In FIG. 3, MVi/N(i=1,2,3,4,5) denotes a reduced motion vector operating from the base B to the head Hi(i=1,2,3,4,5) respectively; B, P, Q, R, S, T, U, V and W are pixels on the preceding frame denoted by closed circles; and open circles signify the base B and the heads Hi's.

In a preferred embodiment of the invention, the pixel data for a head Hi is derived directly from a pixel when the head Hi coincides with the pixel. For instance, H1 is derived from P, while H5 is derived from W.

Each of the pixel data of such heads that fall on a vertical or horizontal line which connects pixels, e.g., H3 or H4, is derived from its two neighboring pixels on the line by multiplying appropriate weight factors thereto. For instance, H3 is derived from S and T; and H4, from U and V.

In a situation where a head is situated inside a square formed by four nearest pixels therefrom, the pixel data thereof is interpolated from those four pixels by applying suitable weight factors thereto. The pixel data of H2, for instance, is derived from P, Q, R and S.

In the preferred embodiment of the present invention, the weight factors are determined based on the reversed ratio of distances between the head of a reduced motion vector and its two or four neighboring pixels. For example, the interpolated pixel data DH3 for head H3 is obtained by summing up the pixel data DS of S multiplied by a weight factor of TH3/(SH3+TH3) and the pixel data DT of T multiplied by a weight factor of SH3/(SH3+TH3), wherein SH3 is the distance between S and H3 and TH3 being the distance between T and H3. In other words, a larger weight factor is applied to a closer pixel in accordance with the preferred embodiment. Similarly, the interpolated pixel data DH2 for head H2 is obtained by multiplying $(PH2+QH2+RH2+SH2)^{-1}$ to the sum of DP×SH2, DQ×RH2, DR×QH2 and DS×PH2, wherein DP, DQ, DR and DS are pixel data of P, Q, R and S, respectively, and PH2, QH2, RH2 and SH2 represent the distances between H2 and P, Q, R and S, respectively, with PH2>QH2>RH2>SH2.

Referring back to FIG. 2, the reduced motion vector by a factor of N is fed from the motion compensator 35 to the interpolator 41 wherein the aforementioned interpolation process is performed. The interpolated pixel data from the interpolator 41 is added to the average pixel difference data from the inverse quantizer $Q^{-1}$ 33 at the adder 37 and written onto the frame memory 39 for storing the reduced image signal.

As a result, there is provided the novel decoding system which is capable of providing compact HDTV receivers with small size pictures, wherein the generation of the small size pictures is achieved by using d.c. coefficients alone, thereby eliminating the need to employ a complicated and costly decoder or decoding process, and enabling the adaptation of a simplified decoding system.

It should be appreciated that the weight factors, which are employed to carry out the interpolation of a pixel data and inversely proportional to the distances between a given head and its two or four nearest pixels in accordance with the preferred embodiment of the invention, may be chosen in different manners: for instance, they may be chosen to be inversely proportional to the square of the ratio of distances as long as use of such weight factors turns out to be more conducive to the reproduction of better pictures.

While the present invention has been described with respect to certain preferred embodiments only, other modifications and variations may be made without departing from the spirit and scope of the present invention as set forth in the following claims.

What is claimed is:

1. A digital image decoding system for generating a reduced image frame from a sequence of compressed image data transmitted from a transmitter, wherein said compressed image data includes a set of discrete cosine transform coefficients which have been encoded from pixel difference data between a block of two-dimensional pixels of a current frame and a corresponding block of its preceding frame and a two-dimensional motion vector which represents a motion displacement between said two blocks, said set of discrete cosine transform coefficients having a d.c. transform coefficient representing the average value of the pixel difference data, which comprises:

means for selectively decoding the d.c. transform coefficient from the set of discrete cosine transform coefficients and the motion vector to produce a quantized transform coefficient and a decoded two-dimensional motion vector;

means for performing inverse quantization on the quantized transform coefficient to produce pixel difference data;

means for reducing the vertical vector component and the horizontal vector component of the decoded motion vector by predetermined factors, respectively, to produce a reduced motion vector so as to compensate the reduced image frame;

a frame memory for storing a previous image frame;

interpolation means for deriving interpolated pixel data corresponding to the reduced motion vector from the previous image frame stored in the frame memory, wherein the interpolation means includes means for interpolating the pixel data from its neighboring pixels by applying weight factors thereto when the reduced motion vectors does not coincide with the pixel location of the reduced image in the frame memory, wherein the weight factors are determined based on the reverse ratio of distance between the head of the reduced motion vectors and its neighboring pixels; and means for summing up the difference data from the inverse quantization means and the pixel data derived from the interpolation means so as to generate the reduced image frame and providing same to the frame memory as the previous image frame.

2. The decoding system of claim 1, wherein the predetermined factors correspond to the number of pixels in the horizontal direction and the vertical direction in the block of two-dimensional pixels, respectively.

* * * * *